Sept. 9, 1969  B. H. PINCKAERS  3,466,502
CONTROLLED RECTIFIER TRIGGERING CIRCUIT
Filed March 13, 1967

INVENTOR.
BALTHASAR H. PINCKAERS
BY Alfred N. Feldman
ATTORNEY

United States Patent Office 3,466,502
Patented Sept. 9, 1969

3,466,502
CONTROLLED RECTIFIER TRIGGERING CIRCUIT
Balthasar H. Pinckaers, Edina, Minn., assignor to Honeywell Inc., Minneapolis, Minn., a corporation of Delaware
Filed Mar. 13, 1967, Ser. No. 622,627
Int. Cl. H01j 19/78
U.S. Cl. 313—238        7 Claims

ABSTRACT OF THE DISCLOSURE

A triggering circuit for a controlled rectifier that discharges a storage capacitor through a transformer primary winding each half-cycle for the generation of an ignition spark. The controlled rectifier is biased to a nonconductive state after each discharge period. Each discharge cycle is initiated by the breakdown of a voltage breakdown device which discharges a secondary capacitor.

BACKGROUND OF THE INVENTION

The present invention has particular utility in the field of ignition of fluid fuels such as gas or oil for residential or commercial heating and process control. Spark ignition devices have been utilized in these fields in the past, but the generation of a sufficiently hot spark with a low power device has been difficult. The problem in many of the spark generation devices which utilize controlled rectifiers is the inability of the device to limit the power lost in charging a storage device, such as a capacitor, due to the firing of the controlled rectifier at an inappropriate time during the charging period. Controlled rectifier spark ignition systems that periodically dump the charge from a capacitor through the primary winding of a step-up transformer have been previously utilized, and it has been found that these devices tend to dissipate an excessive amount of energy in the charging circuit for the main capacitor. The charging circuit generally includes a series resistor through which the main capacitor is charged. This resistor limits the charging current. An investigation of this phenomena has shown that one of the primary reasons for this excessive dissipation is the fact that the controlled rectifier tends to go into conduction during the capacitor charging period. For higher energy-level circuits this tends to cause excessive dissipation in the charging resistor and controlled rectifier as well as radio frequency interference (RFI) noise on the supply line. The present invention eliminates these problems.

SUMMARY OF THE INVENTION

The present invention is directed to a controlled rectifier circuit that periodically discharges a charged capacitor through the primary of a step-up transformer in a spark generation type of circuit. The charging of the capacitor occurs during one half of the applied alternating current voltage cycle, but due to the circuit configuration used with the controlled rectifier in the present invention, the controlled rectifier is biased "off" prior to the beginning of the charge period. The turn on bias is applied to the gate circuit of the controlled rectifier in such a manner as to trigger the controlled rectifier to a conductive state by a voltage breakdown device during the non-charging cycle of the main capacitor. The bias is then abruptly reversed once again to make sure that as soon as the charged capacitor dissipates its energy, that the controlled rectifier is again biased to an "off" condition prior to the application of the charging potential for the main capacitor.

DESCRIPTION OF THE PREFERRED EMBODIMENT

Figure 1:
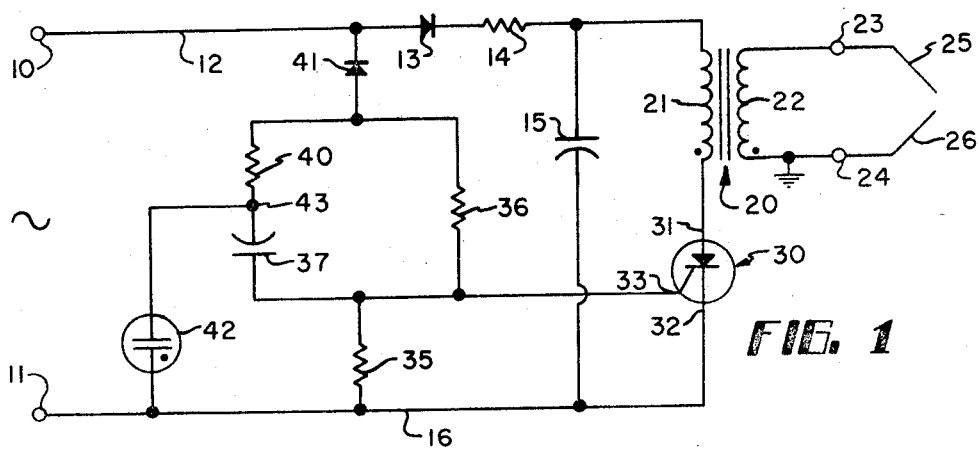
FIGURE 1 is a schematic circuit of a basic form of the present invention.

In the circuit diagram of FIGURE 1 a pair of terminals 10 and 11 are disclosed which are adapted to be connected to a conventional source of alternating current. Terminal 10 is connected through a wire 12 to an asymmetric current conducting means 13 shown as a diode. The asymmetric current conducting means 13 is then connected through a resistor 14 to capacitor means 15 in the form of a single capacitor. The capacitor means 15 in turn is connected by a conductor 16 back to the terminal 11. The circuit including the asymmetric current conducting means 13 and the capacitor means 15 is a charging circuit for the capacitor means 15.

Connected across the capacitor means 15 is a controlled rectifier means 30 and transformer means 20 having a primary winding 21 and a secondary winding 22. The transformer means 20 is a conventional step-up transformer with the secondary winding 22 connected across a pair of terminals 23 and 24 that are in turn connected to a pair of spark electrodes 25 and 26. The primary winding 21 of transformer means 20 is connected to the controlled rectifier means 30 which has an anode 31 connected directly to the primary winding 21 and a cathode 32 connected to conductor 16. The controlled rectifier means 30 is specifically disclosed as a silicon controlled rectifier and further has a gate electrode 33. The circuit between the gate electrode 33 and the cathode 32 is a gate means for the silicon controlled rectifier 33 and the proper potential applied between the gate electrode 33 and the cathode 32 controls the state of conduction of the silicon controlled rectifier 30.

The necessary bias voltage for the silicon controlled rectifier 30 is generated across a resistor or impedence means 35 that is connected directly between the gate electrode 33 and the cathode 32 and is part of a bias voltage means which further includes a resistor 36 that is paralleled by a capacitor means 37 in series with a further resistance 40. The parallel combination of resistor 36 with the capacitor means 37 in series with the resistor 40 is connected through a second asymmetric current conducting means 41 to the conductor 12. The asymmetric current conducting means 41 is again a single diode. A current flow through the bias voltage means including the resistors 35, 36, 40 and the capacitor 37 through the diode 41 provides a control voltage for the silicon controlled rectifier 30, as will be pointed out below.

To complete the circuit for the present invention, a voltage actuated breakdown device 42 is connected between a junction 43 and the conductor 16. The voltage actuated breakdown device 42 has been specifically disclosed as a gas filled tube, such as a neon tube. This device could be any type of voltage actuated breakdown device such as a four-layer diode.

OPERATION

Figure 2:
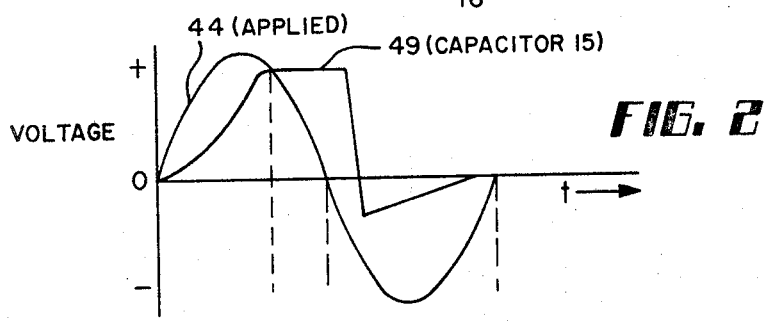
FIGURE 2 is a graphic representation of the wave forms of two voltages in the circuit of FIGURE 1.

The wave form disclosed in FIGURE 2 at 44 is a conventional alternating current voltage wave form that is applied between the terminals 10 and 11. This wave form is shown primarily for reference purposes.

Figure 3:
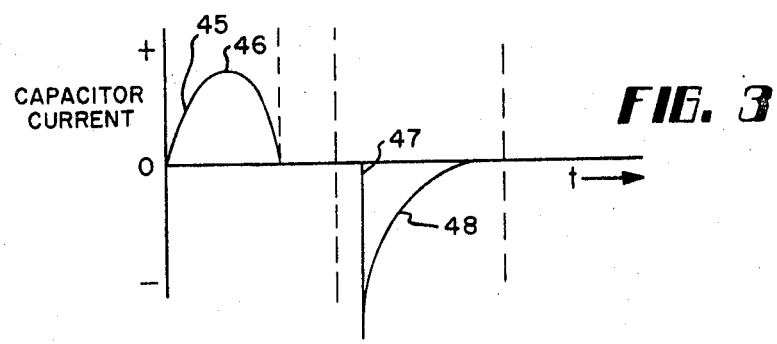
FIGURE 3 is a graphic representation of the wave form of the current charging and discharging the main storage capacitor of the circuit of FIGURE 1.

As the voltage 44 begins to rise in a positive direction (terminal 10 positive), current flows through the asymmetric current conducting means 13 and the resistor 14 to charge the capacitor means 15 as shown in the current wave form 45 of FIGURE 3. The current wave form 45 rises substantially in the same fashion as the applied voltage 44 until the voltage reaches a peak at 46. As the applied voltage then decreases, the current charging capacitor means 15 ceases and the voltage of the capacitor means 15 is subsequently applied across the transformer means 20 and the controlled rectifier means 30. The voltage that builds up on the capacitor 15 is also shown in FIGURE 2 for reference at 49. Without some type of signal applied to the gate means of the controlled rectifier means 30, no conduction can occur. Since the bias voltage means for the controlled rectifier means 30 includes the asymmetric current conducting means 41, no current can flow in the bias voltage means until the applied voltage 44 reverses in direction. As soon as the voltage 44 reverses in direction or polarity, a current starts to conduct from terminal 11 through the resistor 35 to the capacitor means 37 which thus begins to charge. A small amount of current starts to be drawn through the parallel resistor 36 at this time. The bias voltage means including the resistors 35, 36, and the series combination of capacitor means 37 and resistor 40 becomes a voltage divider network of sorts and the junction 43 has an increasing negative potential with respect to the conductor 16. At some selected voltage level, the voltage actuated breakdown device 42 begins to conduct. This type of device normally breaks down at one voltage and conducts at a substantially constant lower voltage. The difference in voltage between the breakdown point and conduction point must be dissipated from the capacitor means 37 and in the present case is dissipated as a current flow from the capacitor means 37 through the resistor 35 and through the voltage breakdown means 42 in a direction reverse to that of the original charging current for the capacitor means 37. The current flow thus generated flows in resistor 35 in a direction to generate a positive potential between the gate electrode 33 and the cathode 32. This positive voltage on the gate means of the controlled rectifier 30 triggers the controlled rectifier 30 into a conductive state wherein the charge on capacitor means 15 can be dissipated through the primary winding 21 of the transformer means 20. This in turn supplies a pulse of energy through the transformer means 20 to the secondary winding 22 where the pulse of energy is dissipated across the electrodes 25 and 26 as an electric spark.

Figure 4:
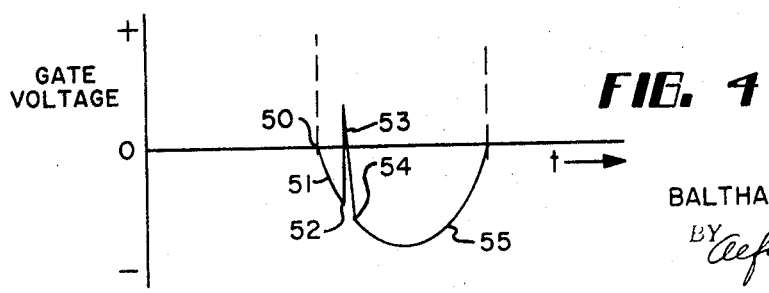
FIGURE 4 is a graphic representation of the wave form of the gate bias voltage applied to the controlled rectifier in the circuit of FIGURE 1.

The discharge of current from capacitor means 15 is shown in FIGURE 3 as initiated at 47 and continuing with the discharge curve 48 showing that the current flow from capacitor means 15 reaches substantially the zero level prior to the end of the applied voltage cycle. In order to insure that the controlled rectifier means 30 does not continue conducting upon a reversal of the applied voltage for the next cycle, it is essential that the controlled rectifier means 30 be biased in such a manner as to insure that it is no longer conductive. This is the function of the present bias voltage means in that as soon as the capacitor means 37 discharges sufficiently through the resistor 35 and the voltage actuated breakdown device 42, the conduction in a triggering or positive direction ceases and the resistor 35 continues to draw a current through the asymmetric current conducting means 41 in a negative direction that applies a cut-off potential or bias to the gate means of the controlled rectifier means 30. This cut-off bias continues for the balance of the negative portion of the applied voltage cycle. The bias voltage is shown in FIGURE 4. It is noted at 50 that the voltage applied between the gate electrode 33 and the cathode 32 starts to become negative when the applied potential between terminals 10 and 11 goes negative. The potential continues to go negative at 51 until the voltage actuated breakdown device 42 begins to conduct at point 52. A positive bias or spike of voltage caused by the discharge of capacitor 37 through the resistor 35 is shown at 53. This discharge occurs for a short period of time in order to adjust for the shift of voltage from the higher actuating voltage of the breakdown device 42 to its conducting voltage. As soon as the discharge of capacitor means 37 is complete at 54, the negative bias continues at 55 and is substantially present across the gate 33 to cathode 32 circuit during the balance of the discharge cycle of the capacitor means 15 through the controlled rectifier means 30. It is thus apparent that a negative voltage is applied to the gate means of the controlled rectifier 30 as the capacitor means 15 completes its discharge cycle. This insures that the controlled rectifier means 30 is biased to an "off" condition and will not conduct when the applied voltage again reverses at terminals 10 and 11 to being the charge cycle for the capacitor means 15.

By supplying a negative bias to the controlled rectifier means 30 during the late portion of the discharge of the capacitor means 15, the controlled rectifier means 30 is cut off or becomes nonconductive in a manner that will prevent accidental conduction of the controlled rectifier means 30 when current is again drawn through the asymmetric current conducting means or diode 13 to charge the capacitor means 15. In many previous circuits this has not been true and there have been cases where the charge current for the capacitor means 15 occurred simultaneously with current being drawn through the controlled rectifier means 30. This increase in current drain through the resistor 14 dissipated an excessive amount of energy. This required that the resistor 14 be able to dissipate large amounts of electric energy in the form of heat and also decreased the amount of energy available between the spark electrodes 25 and 26. The present circuit inures that the charge current drawn is the only current drawn during the positive half-cycle of the applied voltage and that the controlled rectifier means dissipates this energy in its entirety through the transformer means and is then positively cut off once again prior to the beginning of the charging cycle for the main capacitor. With the present arrangement a minimum dissipation in the series limiting resistor exists along with a maximum dissipation in the spark gap when the capacitor is discharged for the generation of an electric arc. Furthermore, this precludes the existence of rapidly rising or falling currents in the alternating current supply, which then makes radio frequency interference negligibly small.

In the circuit disclosed in FIGURE 1 the resistor 36 has been shown as part of the bias voltage means. The inclusion of resistor 36 is not essential, even though desirable. Many other possible modifications are possible in the present simple circuit and these modifications would be obvious to one skilled in the art. As a result of this, the applicant wishes to be limited in the scope of his invention solely by the scope of the appended claims.

The embodiments of the invention in which an exclusive property or right is claimed are defined as follows:

1. A circuit for periodically discharging capacitor means through controlled rectifier means with said controlled rectifier means being biased to a nonconductive state after each discharge period, including: first asymmetric current conducting means and first capacitor means in series circuit, said circuit being connected between a pair of terminals which are adapted to be energized from a source of alternating current; controlled rectifier means and transformer means in series circuit and connected across said first capacitor means to periodically discharge said first capacitor means through said transformer means; bias voltage means including second capacitor means and second symmetric current conducting means connected to said terminals with said second capacitor means being charged when said source of alternating current voltage causes a current to flow through said second asymmetric current conducting means in said bias voltage means; said bias voltage means further including impedance means in series circuit with said second asymmetric current conducting means; said controlled rectifier means having gate means to initiate conduction through said controlled rectifier means, said gate means being connected across said impedance means; and voltage breakdown means connected across said second capacitor means and said impedance means to discharge said second capacitor means through said impedance means to cause said controlled rectifier means to discharge said first capacitor means through said transformer means.

2. A circuit for periodically dicharging capacitor means through controlled rectifier means with said controlled rectifier means being biased to a nonconductive state after each discharge cycle as described in claim 1, wherein said controlled rectifier means is a silicon controlled rectifier and said impedance means is a resistor.

3. A circuit for periodically discharging capacitor means through controlled rectifier means with said controlled rectifier means being biased to a nonconductive state after each discharge cycle as described in claim 1, wherein said voltage breakdown means is a gas filled tube.

4. A circuit for periodically discharging capacitor means through controlled rectifier means with said controlled rectifier means being biased to a nonconductive state after each discharge cycle as described in claim 3, wherein said controlled rectifier means is a silicon controlled rectifier and said impedance means is a resistor.

5. A circuit for periodically discharging capacitor means through controlled rectifier means with said controlled rectifier means being biased to a nonconductive state after each discharge cycle as described in claim 4, wherein both of said asymmetric current conducting means are diodes and both of said capacitor means are capacitors.

6. A circuit for periodically discharging capacitor means through controlled rectifier means with said controlled rectifier means being biased to a nonconductive state after each discharge cycle as described in claim 5, wherein said transformer means includes an output winding; and a spark gap connected to said output winding; said spark gap dissipating as an electrical arc the energy from the discharge of said first capacitor means through said transformer means.

7. A circuit for periodically discharging capacitor means through controlled rectifier means with said controlled rectifier means being biased to a nonconductive state after each discharge cycle as described in claim 6, wherein said voltage bias means further includes a resistor in a series charging circuit with said second capacitor and a further resistor in parallel circuit with said series charging circuit to provide a current path through said first resistor connected across said gate means of said silicon controlled rectifier to bias said silicon controlled rectifier when said bias voltage means has a current flow therein.

References Cited

UNITED STATES PATENTS

| | | | |
|---|---|---|---|
| 3,377,125 | 4/1968 | Zielinski | 431—74 |
| 3,201,597 | 8/1965 | Balan | 307—252 |
| 3,400,302 | 9/1968 | Miller | 317—96 |

JOHN W. HUCKERT, Primary Examiner

B. ESTRIN, Assistant Examiner

U.S. Cl. X.R.

307—252; 315—209, 241